(12) United States Patent
Hinds

(10) Patent No.: US 8,922,822 B2
(45) Date of Patent: Dec. 30, 2014

(54) IMAGE TRANSFORM SIGNATURE GENERATION MECHANISM

(75) Inventor: Arianne T. Hinds, Louisville, CO (US)

(73) Assignee: Ricoh Production Print Solutions LLC, Boulder, CO (US)

(*) Notice: Subject to any disclaimer, the term of this patent is extended or adjusted under 35 U.S.C. 154(b) by 251 days.

(21) Appl. No.: 13/204,170

(22) Filed: Aug. 5, 2011

(65) Prior Publication Data
US 2013/0033728 A1  Feb. 7, 2013

(51) Int. Cl.
*G06K 15/00* (2006.01)
*G06F 12/00* (2006.01)
*G06K 15/02* (2006.01)
*G06F 3/12* (2006.01)

(52) U.S. Cl.
CPC ........ *G06K 15/1889* (2013.01); *G06K 15/1886* (2013.01)
USPC ........ 358/1.16; 358/1.17; 358/1.13; 358/403; 711/100; 711/118; 711/216

(58) Field of Classification Search
CPC ............. G06F 3/1204; G06F 3/1211–3/1215; G06F 3/122; G06F 3/124; G06F 3/1247; G06F 8/4441; G06F 8/4442; G06F 12/0862; G06F 12/0864; G06F 12/0877; G06F 12/0879; G06F 12/0882; G06F 21/64; G06F 15/1827; G06F 15/1831; G06F 15/1832; G06F 15/1835; G06F 15/1836; G06F 15/1863

USPC ................. 358/1.1, 1.11–1.18, 3.28, 1.9, 2.1, 358/537–540, 403, 405, 426.06; 711/117–122, 170–173, 216, 100; 707/747, 698; 382/100, 232; 380/210, 380/287, 54; 713/176; 480/460; 386/94; 399/366; 283/906; 726/26, 31
See application file for complete search history.

(56) References Cited

U.S. PATENT DOCUMENTS

| | | | |
|---|---|---|---|
| 7,469,380 B2 | 12/2008 | Wessling | |
| 7,584,362 B2 | 9/2009 | Paya | |
| 2007/0022293 A1 | 1/2007 | Hayashi | |
| 2007/0127077 A1* | 6/2007 | Tamura | 358/3.28 |
| 2007/0147610 A1* | 6/2007 | Kethi Reddy | 380/229 |
| 2008/0012972 A1 | 1/2008 | Hirai | |
| 2008/0211819 A1* | 9/2008 | Hopp et al. | 345/520 |
| 2010/0060935 A1* | 3/2010 | Nakao et al. | 358/1.18 |
| 2010/0060936 A1* | 3/2010 | Shitara et al. | 358/1.18 |
| 2010/0157358 A1* | 6/2010 | Rijavec | 358/1.15 |
| 2012/0331307 A1* | 12/2012 | Fernandez Gutierrez | 713/190 |

* cited by examiner

*Primary Examiner* — Chad Dickerson
(74) *Attorney, Agent, or Firm* — Blakely, Sokoloff, Taylor & Zafman LLP

(57) ABSTRACT

A method is disclosed. The method includes receiving a first data component of an image data stream at a cache within a control unit, appending a first signature value to the first data component to obtain a first modified image data and generating a second signature value based on the first modified image data.

17 Claims, 4 Drawing Sheets

IMAGE TRANSFORM SIGNATURE GENERATION MECHANISM

FIELD OF THE INVENTION

This invention relates generally to the field of printing systems. More particularly, the invention relates to image processing in a printing system.

BACKGROUND

Print systems include presentation architectures that are provided for representing documents in a data format that is independent of the methods that are utilized to capture or create those documents. One example of an exemplary presentation system, which will be described herein, is the (Advanced Function Presentation) AFP™ system developed by International Business Machines Corporation. According to the AFP system, documents may include combinations of text, image, graphics, and/or bar code objects in device and resolution independent formats. Documents may also include and/or reference fonts, overlays, and other resource objects, which are required at presentation time to present the data properly.

Once the documents are received at a printer, processing is performed to convert a document into a printable format. However, processing high-resolution images in an incoming data stream into a printable format typically involves highly compute-intensive operations (e.g., scaling, rotation, decompression, color conversion, etc.).

Further, it is common for a printer to frequently process repetitive images throughout a print job. For instance, a print job may include a full-page background image or a company logo that appears on every printed page. Thus, printers may cache images to avoid the need to render images that have previously been presented and rendered into sheet maps. Such caching of rendered image bitmaps improves the overall performance of a system provided that the system has a mechanism (such as a hash key or "digital signature" generator) to uniquely identify an image. That is, the printer must be able to accurately identify an image so as to avoid using the incorrect rendered bitmap from the image cache.

In the image transform, a signature is created based on the entire contents of the image. However, this requires that the entire image reside in a memory buffer (or file system) at the point where the signature is created. For Image Object Content Architecture Format (IOCA) images, this is especially limiting given that the input can be processed in a serial manner (e.g., the input can be "streamed" to the image transform). Moreover, there is a need in some printers to uniquely identify an image without having the entire image resident in a memory buffer or file system. For example, in some printing environments, available memory to process images and related objects on each page is extremely limited.

As a result, a mechanism to generate digital signatures for image identification where the image does not entirely exist is desired.

SUMMARY

In one embodiment, a method is disclosed. The method includes receiving a first data component of an image data stream at a cache within a control unit, appending a first signature value to the first data component to obtain a first modified image data and generating a second signature value based on the first modified image data.

In another embodiment, a printer includes a print engine; and a control unit. The control unit includes a cache to receive an image data stream; and an image transform to append a first signature value to a first data component received at the cache to obtain a first modified image data and generate a second signature value based on the first modified image data.

BRIEF DESCRIPTION OF THE DRAWINGS

A better understanding of the present invention can be obtained from the following detailed description in conjunction with the following drawings, in which.

DETAILED DESCRIPTION

A mechanism to generate image transform signatures in a print system is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
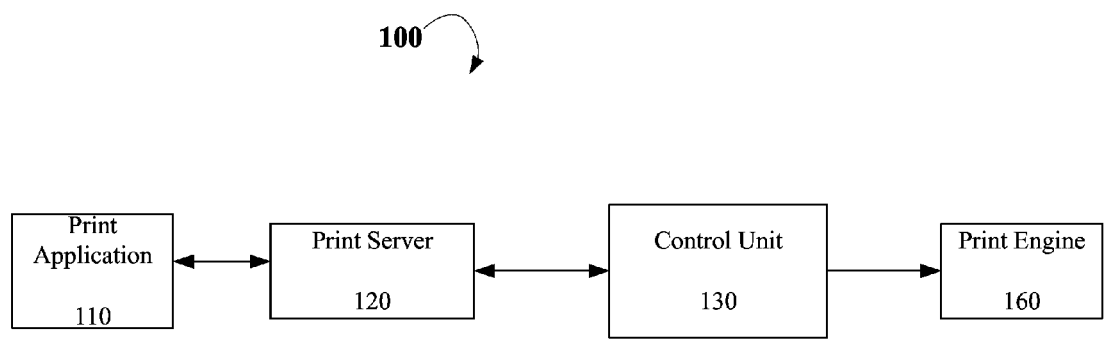
FIG. 1 illustrates one embodiment of a printing system.

FIG. 1 illustrates one embodiment of a printing system 100. Printing system 100 includes a print application 110, a server 120, a control unit 130 and a print engine 160. Print application 110 makes a request for the printing of a document. In one embodiment, print application 110 provides a Mixed Object Document Content Architecture (MO:DCA) data stream to print server 120.

In other embodiments print application 110 may also provide PostScript (P/S) and PDF files for printing. P/S and PDF files are printed by first passing them through a pre-processor (not shown), which creates resource separation and page independence so that the P/S or PDF file can be transformed into an AFP MO:DCA data stream prior to being passed to print server 120.

Print server 120 processes pages of output that mix all of the elements normally found in presentation documents, e.g., text in typographic fonts, electronic forms, graphics, image, lines, boxes, and bar codes. The AFP MO:DCA data stream is composed of architected, structured fields that describe each of these elements.

In one embodiment, print server 120 communicates with control unit 130 via an Intelligent Printer Data Stream (IPDS). The IPDS data stream is similar to the AFP data steam, but is built specific to the destination printer in order to integrate with each printer's specific capabilities and command set, and to facilitate the interactive dialog between the print server 120 and the printer. The IPDS data stream may be built dynamically at presentation time, e.g., on-the-fly in real time. Thus, the IPDS data stream is provided according to a device-dependent bi-directional command/data stream.

According to one embodiment, control unit 130 process and renders objects received from print server and provides sheet maps for printing to print engine 160. In such an embodiment, control unit 130 includes a multitude (e.g., ten) of compute node machines, with each node having two or more parallel page output handlers (POH's). In one embodiment, each POH includes a separate transform that processes received objects. In such an embodiment, the transforms process image objects. However, in other embodiments, the transforms may process any type of data object received at control unit 130.

Figure 2:
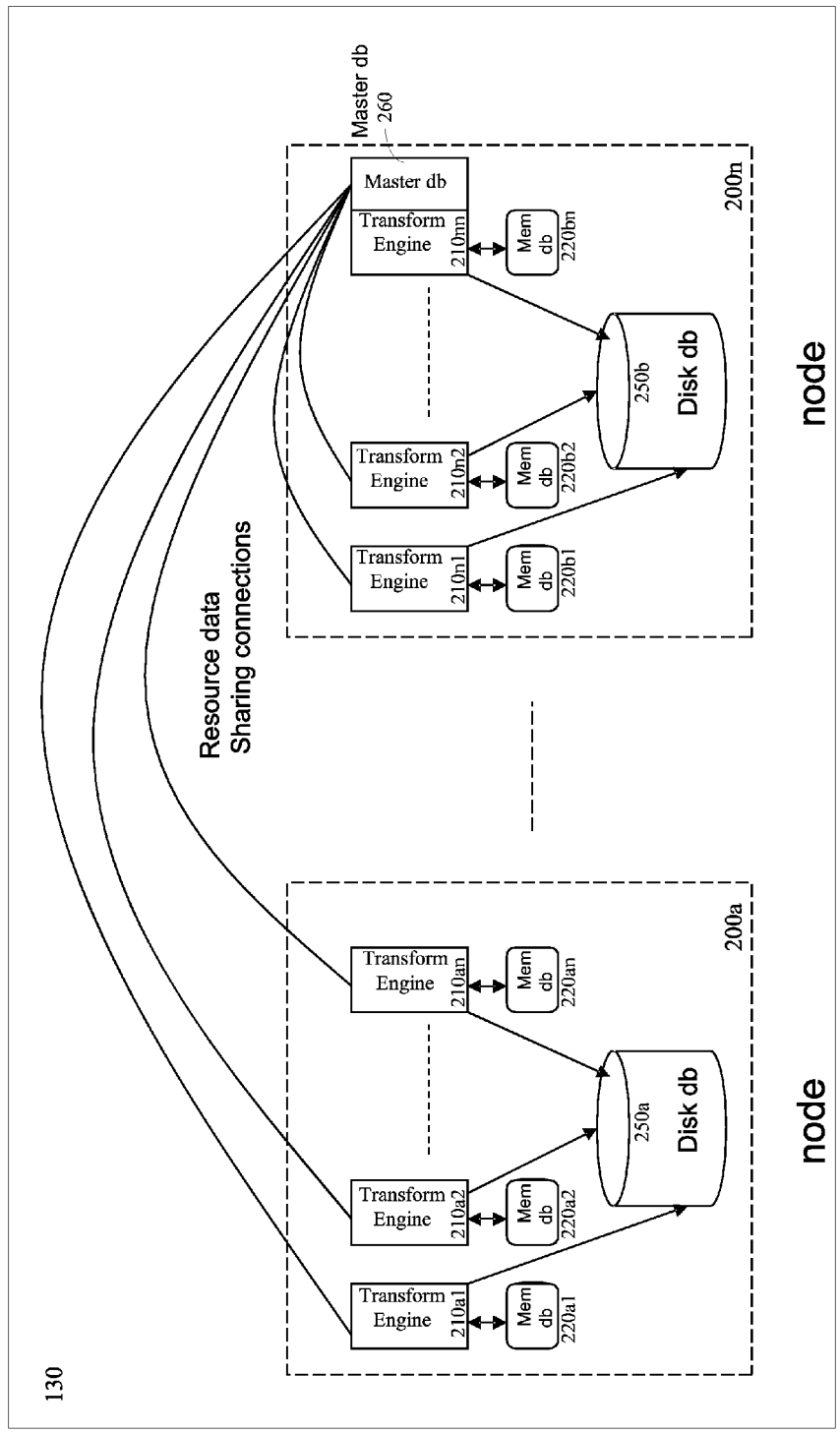
FIG. 2 illustrates one embodiment of a control unit.

FIG. 2 illustrates one embodiment of a control unit 130 including compute nodes 200a-200n. As shown in FIG. 2, node 200a includes transform engines (transforms) 210a1-210an, while node 200n includes transforms 210n1-210nn. In one embodiment, each transform 210 includes an associated memory database (or local cache) 220 that caches image objects that a corresponding transform 210 encounters more than once.

Figure 3:
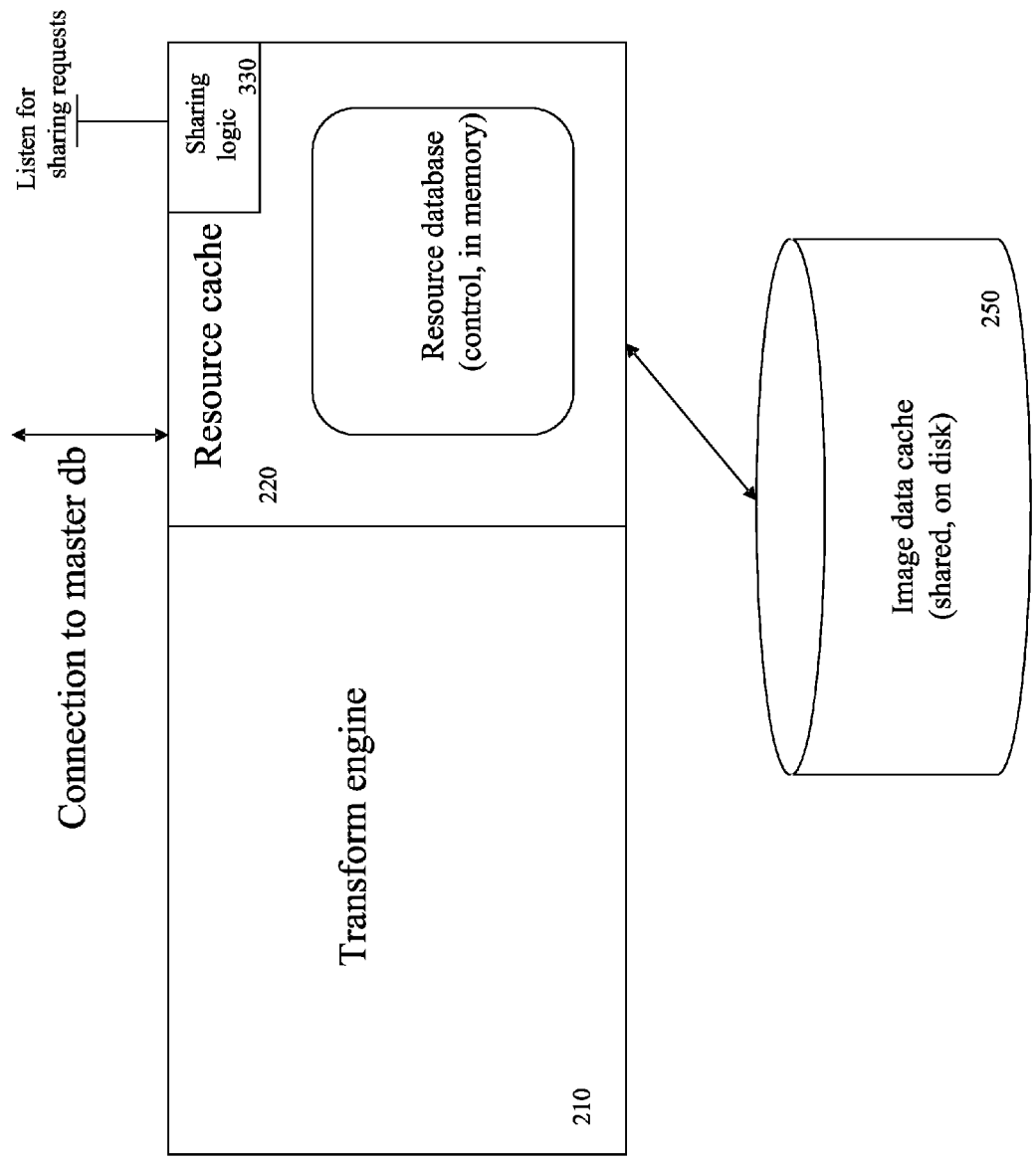
FIG. 3 illustrates one embodiment of a computer node.

FIG. 3 illustrates another embodiment of compute node 200 showing a single transform engine 210 and local cache 220. According to one embodiment, each object received at control unit 130 is tagged with a unique identifier (UID). In one embodiment, the UID is a Message-Digest algorithm 5 (MD5) encryption based on processing parameters, data length and a data MD5 hash. In addition to the UID, each object includes control information and data.

In one embodiment, the control information is relatively small (e.g., less than 200 bytes) and describes the object's dimensions and placement. Since the control information is relatively small, the control information and UID for an object is stored in the local cache 220 associated with the transform 210 that processed the object. Meanwhile, the object data is stored at a disk database 250 since the data is typically large. Disk database 250 is central to each of the transforms 210 at node 200, and thus stores data for objects processed by all of the transforms 210.

As discussed above, available memory at control unit 130 to generate object UIDs may be limited. Particularly, memory resources may be insufficient to store the entire content of an image while generating a UID. According to one embodiment, transforms 210 generate UID signatures by recursively generating signatures created based on partial image content until the entire image has been received, at which point the last signature generated is the UID used to identify the image.

Figure 4:
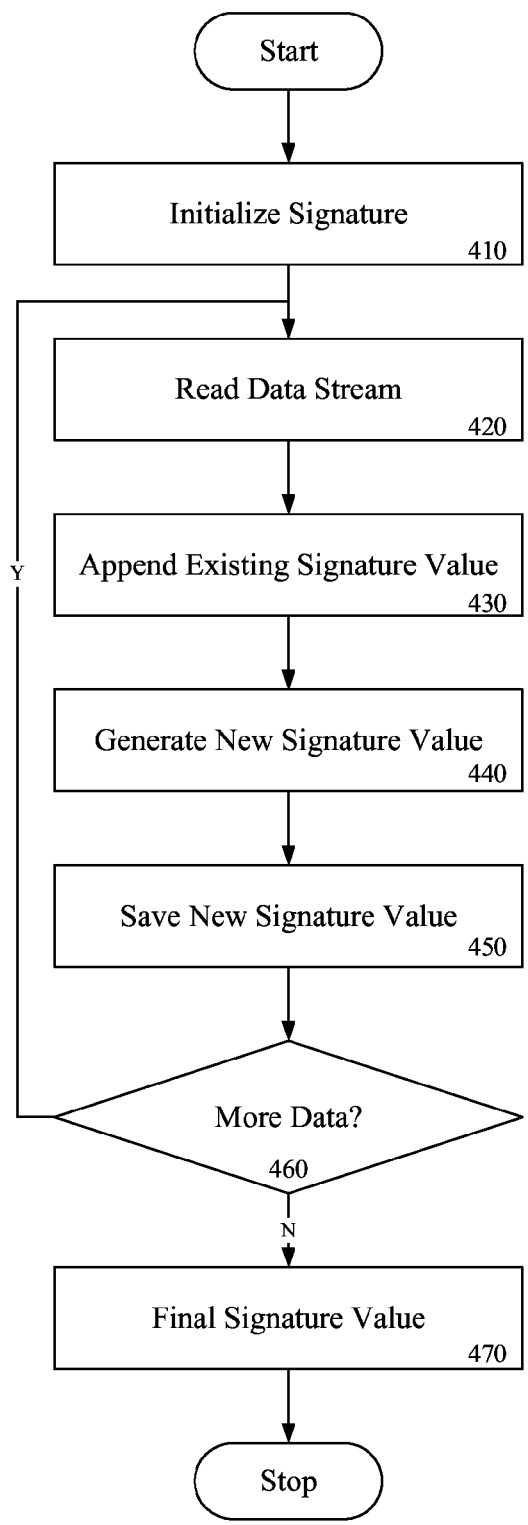
FIG. 4 is a flow diagram illustrating one embodiment of the operation of a control unit.

FIG. 4 is a flow diagram illustrating the operation of a transform 210 for generating a UID upon an object being received. At processing block 410, the signature is initialized to some initial value. At processing block 420, bytes of data are read from the image input data stream into local cache 220. According to one embodiment, transform 210 reads in an amount of data in bytes equivalent to the local cache 220 size minus the signature size (e.g., 100 bytes), or until the end of the image is reached.

At processing block 430, the current signature value is appended to the data read in processing block 420 (e.g., the initial signature value for the first read data) to create modified image data. At processing block 440, a new signature is generated based on the modified image data in local cache 220. At processing block 450, the new signature value, which replaces the current signature (e.g., the initial signature value), is stored.

In one embodiment, transform 210 may begin serially processing the image as the image is received. In such an embodiment, transform 210 is provided the originally received image data (e.g., not the modified image data). In a further embodiment, the output from transform 210 may be referenced by the signature created based on the modified image data. Alternatively, transform 210 may be provided the actual number of bytes read into cache 220 (e.g., data in cache 220 without the signature).

At decision block 460, it is determined whether there is additional bytes of data in the data stream that is to be processed. If so, control is returned to processing blocks 420-450, where subsequent bytes of the image input data stream are read into cache 220, the current signature value (e.g., value calculated in the previous iteration) is appended to the read data to create modified image data and a new signature is generated the current signature value is appended to the data read and stored. If the end of the data stream has been reached, the signature generated in processing block 440 is used as the UID to identify the image, processing block 470.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A method comprising.
receiving a first binary data component of an image data stream at a cache within a control unit;
appending a first binary signature value to the first binary data component to obtain first modified image data;
generating a second binary signature value based on the first modified image data independent of a determination of additional components of data in the image data stream;
storing the second binary signature value in the cache with the first modified image data, wherein the second binary signature value replaces the first binary signature value;
determining if there are additional components of data in the image data stream;
receiving a second binary data component of the image data stream at the cache if there are additional components of data in the image data stream; and
appending the second binary signature value to the second binary data component to obtain second modified image data.

2. The method of claim 1 further comprising generating the signature value prior to receiving the first binary data component.

3. The method of claim 2 further comprising storing the second binary signature value.

4. The method of claim 3 further comprising serially processing the first binary data component.

5. The method of claim 4 wherein processing the first binary data component comprises processing the image data as the first binary data component is received in the cache.

6. The method of claim 1 further comprising:
generating a third binary signature value based on the second modified image data.

7. The method of claim 1 further comprising using the second binary signature value to identify an image represented by the image data stream if there are no additional binary components of data in the image data stream.

8. The method of claim 2 wherein the first binary data component is equivalent to a size of the cache minus the first binary signature value.

9. A printer comprising:
a print engine; and
a control unit having:
a cache to receive an image data stream; and
an image transform to append a first binary signature value to a first binary data component received at the cache to obtain a first modified image data,
store the first modified image data in a local cache,
generate a second binary signature value based on the first modified image data independent of a determination of additional components of data in the image data stream,
determine if there are additional binary components of data in the image data stream, store the second binary signature value in the cache with the first modified image data,
wherein the second binary signature value replaces the first binary signature value,
receive a second binary data component of the image data stream at the cache if there are additional components of data in the image data stream and append the second binary signature value to the second data component to obtain second modified image data.

10. The printer of claim 9 wherein the image transform stores the second binary signature value.

11. The printer of claim 10 wherein the image transform processes the first binary data component.

12. The printer of claim 9 wherein the image transform further generates a third binary signature value based on the second modified image data.

13. The printer of claim 9 further wherein the image transform uses the second binary signature value to identify an image represented by the image data stream if there are no additional binary components of data in the image data stream.

14. An article of manufacture comprising a non-transitory machine-readable medium including data that, when accessed by a machine, cause the machine to perform operations comprising:
receiving a first binary data component of an image data stream at a cache within a control unit;
appending a first binary signature value to the first binary data component to obtain first modified image data;
generating a second binary signature value based on the first modified image data independent of a determination of additional components of data in the image data stream;
storing the second binary signature value in the cache with the first modified image data, wherein the second binary signature value replaces the first binary signature value;
determining if there are additional components of data in the image data stream;
receiving a second binary data component of the image data stream at the cache if there are additional components of data in the image data stream; and
appending the second binary signature value to the second binary data component to obtain second modified image data.

15. The article of manufacture of claim 14 wherein the machine-readable medium includes data that causes the machine to perform further operations comprising storing the second binary signature value.

16. The article of manufacture of claim 14 wherein the machine-readable medium includes data that causes the machine to perform further operations comprising:
generating a third binary signature value based on the second modified image data.

17. The article of manufacture of claim 14 wherein the machine-readable medium includes data that causes the machine to perform further operations comprising using the second binary signature value to identify an image represented by the image data stream if there are no additional binary components of data in the image data stream.

* * * * *